United States Patent
Moriyoshi

(10) Patent No.: US 8,929,463 B2
(45) Date of Patent: Jan. 6, 2015

(54) MOVING IMAGE DECODING DEVICE, MOVING IMAGE DECODING METHOD, AND PROGRAM

(75) Inventor: Tatsuji Moriyoshi, Tokyo (JP)

(73) Assignee: NEC Corporation, Tokyo (JP)

( * ) Notice: Subject to any disclaimer, the term of this patent is extended or adjusted under 35 U.S.C. 154(b) by 262 days.

(21) Appl. No.: 13/143,412

(22) PCT Filed: Dec. 25, 2009

(86) PCT No.: PCT/JP2009/007290
§ 371 (c)(1),
(2), (4) Date: Jul. 6, 2011

(87) PCT Pub. No.: WO2010/079577
PCT Pub. Date: Jul. 15, 2010

(65) Prior Publication Data
US 2011/0268192 A1    Nov. 3, 2011

(30) Foreign Application Priority Data
Jan. 7, 2009   (JP) ................ P2009-001552

(51) Int. Cl.
| | |
|---|---|
| *H04N 7/32* | (2006.01) |
| *H04N 19/70* | (2014.01) |
| *H04N 19/583* | (2014.01) |
| *H04N 19/89* | (2014.01) |
| *H04N 19/166* | (2014.01) |
| *H04N 19/44* | (2014.01) |
| *H04N 19/105* | (2014.01) |
| *H04N 19/61* | (2014.01) |
| *H04N 19/46* | (2014.01) |

(52) U.S. Cl.
CPC ... *H04N 19/00884* (2013.01); *H04N 19/00727* (2013.01); *H04N 19/00933* (2013.01); *H04N 19/00242* (2013.01); *H04N 19/00533* (2013.01); *H04N 19/00024* (2013.01); *H04N 19/00781* (2013.01); *H04N 19/00545* (2013.01)
USPC .................................................. 375/240.27

(58) Field of Classification Search
None
See application file for complete search history.

(56) References Cited

U.S. PATENT DOCUMENTS

| | | | |
|---|---|---|---|
| 6,530,055 B1 * | 3/2003 | Fukunaga | ................. 714/746 |
| 2007/0291836 A1 * | 12/2007 | Shi et al. | ................. 375/240.01 |
| 2009/0262837 A1 * | 10/2009 | Tokumo et al. | ......... 375/240.27 |

FOREIGN PATENT DOCUMENTS

| | | |
|---|---|---|
| JP | 2004528752 A | 9/2004 |
| JP | 2006186911 A | 7/2006 |
| JP | 2006295910 A | 10/2006 |
| WO | 2008063687 A | 5/2008 |

OTHER PUBLICATIONS

ITU-T Recommendation H.264, Series H: Audiovisual and Multimedia Systems, "Advanced video coding for generic audiovisual services", Mar. 2005.
International Search Report for PCT/JP2009/007290 mailed May 11, 2010.
G. J. Sullivan, "Directx Video Acceleration Specification for H.264/AVC Decoding", Dec. 2007.

* cited by examiner

Primary Examiner — Sath V Perungavoor
Assistant Examiner — Kate Luo
(74) Attorney, Agent, or Firm — Sughrue Mion, PLLC

(57) ABSTRACT

There are provided an analysis unit that analyzes an input bit stream to output first intermediate data and analysis information, a conversion rule storage unit that stores a conversion rule, according to which an error-detected bit stream included in the analysis information output from the analysis unit or a bit stream including reference information to an image used for a method not supported by a decoding unit is converted into a bit stream decodable by the decoding unit, and a conversion unit that converts the analysis information into second intermediate data according to the conversion rule, as well as the decoding unit that decodes the first intermediate data and the second intermediate data output from the analysis unit and the conversion unit. Thus, even when the decoding unit does not cope with specific information included in the analysis information, the decoding unit is able to stably perform a decoding procedure.

11 Claims, 14 Drawing Sheets

MOVING IMAGE DECODING DEVICE, MOVING IMAGE DECODING METHOD, AND PROGRAM

This application is the National Phase of PCT/JP2009/007290, filed Dec. 25, 2009, which claims priority on Japanese Patent Application No. 2009-1552 filed Jan. 7, 2009, the entire content of which is incorporated herein by reference.

TECHNICAL FIELD

This invention relates to decoding devices of moving image data, and in particular to moving image decoding devices that are able to decode moving image data with limited compatibility or moving image data undergoing partial deficiency.

BACKGROUND ART

As the technology that is able to encode moving image data (or moving image signals) into coded data at a low bit rate with a high compression factor and a high picture quality, various international standards, namely H.261 and H.263 standardized by the ITU (International Telecommunication Union), MPEG-1, MPEG-2, MPEG-4 standardized by the ISO (International Organization for Standardization), and VC-1 of SMPTE (Society of Motion Picture and Television Engineers) have been widely known. Recently, the ITU and the ISO have jointly standardized H.264 (see Non-Patent Document 1). Compared to the conventional moving image coding technology, H.264 is known to further improve compression efficiency and picture quality.

Recently, a high demand is raised with respect to large video screens and high-definition picture quality; hence, video images utilized in broadcasting, video content marketing and video distribution using optical disks have essentially involved high resolutions called HD (High Definition) (1920×1080 pixels, 1280×720 pixels) higher than those of conventional video images.

Complex calculations are needed in decoding moving images which are encoded according to the H.264 standard; hence, a very high calculation ability is needed to decode high-definition vide images. For this reason, decoding is not necessarily performed on the software implemented by a general-purpose processor, but decoding needs to be performed using specific semiconductor chips specified in decoding or circuit blocks called IP cores (Intellectual Property Cores). In either case, it is not a wise policy to specifically design tasks involving input/output operations with external devices, such as a task for supplying moving image bit streams to a decoding IP core and a task for managing an image buffer storing decoding results. For this reason, a cooperated operation with functionality sharing has been occasionally implemented such that these tasks are implemented using a general-purpose processor while decoding is implemented using a decoding IP core.

In the DXVA (DirectX Video Acceleration) standard used for PC (personal computer) (see Non-Patent Document 2), for example, a general-purpose processor (hereinafter, simply referred to as a CPU) implements a series of tasks for retrieving H.264 ES (Elementary Stream) from input data of MPEG-2 TS (Transport Stream), analyzing its content, and producing intermediate data according to a predetermined format. Subsequently, a decoding accelerator normally built in a GPU (Graphics Processing Unit) implements a task of decoding intermediate data and producing decoded video images. As described above, the CPU and the GPU share the functionality of decoding.

FIG. 11 is a functional block diagram of a moving image decoding device 1000 involving decoding. A bit stream storage unit 1001 such as a hard-disk unit stores bit streams of coded moving images, which are supplied to an analysis unit 1002. The analysis unit 1002 analyzes bit streams supplied thereto so as to produce intermediate data according to a predetermined format, which are then forwarded to an intermediate data storage unit 1003. Intermediate data output from the intermediate data storage unit 1003 are supplied to a decoding unit 1004. The decoding unit 1004 decodes images with reference to intermediate data and previously decoded images stored in an image memory 1005, so that the decoding result is stored in the image memory 1005. The image memory 1005 is able to store plural sections of images, to store decoded images output from the decoding unit 1004, to supply decoded images intended for subsequent decoding, and to supply images to an output unit 1006. The output unit 1006 outputs images input thereto so as to display images. A control unit 1007 involves controls as to which section among sections of the image memory 1005 needs to be supplied for decoding of the decoding unit 1004, which section the decoding result needs to be stored in, and which section needs to be supplied to the output unit 1006. Additionally, the control unit 1007 controls the analysis unit 1002, the decoding unit 1004, and the output unit 1006, thus implementing decoding.

Various options are provided on the functionality sharing between the CPU and the GPU. FIGS. 12 and 13 show examples of the functionality sharing between the CPU and the GPU with the moving image decoding device 1000 shown in FIG. 11. In the moving image decoding device shown in FIG. 12, for example, the function of the decoding unit 1004 is solely assigned to the GPU, whilst the other functions are all assigned to the CPU and the storage unit connected to the CPU.

In the moving image decoding device shown in FIG. 13, the functions of the decoding unit 1004, the image memory 1005 and the output unit 1006 are assigned to the GPU and the storage unit connected to the GPU, whilst the other functions are assigned to the CPU and the storage unit connected to the CPU.

A plurality of modes is determined with respect to the format of intermediate data stored in the intermediate data storage unit 1003. For instance, information regarding SPS (Sequence Parameter Set), PPS (Picture Parameter Set) and Slice Header is analyzed by the CPU so that the analysis result is supplied to the CPU, whilst information of Slice Data is not analyzed by the CPU so that bit streams are directly supplied to the GPU.

FIG. 14 shows an exemplary configuration of intermediate data. The intermediate data includes header analysis information 2002, image buffer information 2003, and a bit stream 2004. The analysis unit 1002 analyzes bit streams of SPS, PPS and Slice Header, so that the analysis result is stored as the head analysis information 2003. For instance, the header analysis information 2003 includes information regarding widths and heights of images, num_ref_frames regarding the number of reference pictures used for decoding, FieldOrderCnt regarding the order of outputting pictures, and pic_init_qp_minus26 regarding an initial value of a quantization parameter used for decoding pictures.

The image buffer information 2003 includes information regarding the status of DPB (Decoded Picture Buffer) used for decoding. With the DPB operations, such as adding pictures to the DPB, eliminating pictures from the DPB, and changing the status of reference in the DPB, the status of the DPB, at a time of decoding a specific picture when the analysis unit 1002 processes bit streams according to analysis information regarding SPS, PSP, is stored as the image buffer information 2003. The image buffer information 2003 includes FieldOrderCnt for each reference frame, FrameNum, and a flag as to whether or not to denote Long Term reference picture. Since the entity of image data is stored in the image memory 1005 of the moving image decoding device shown in FIG. 11, index information (i.e. an image-memory index) indicating the correspondence between each picture of the DPB and the section of image data within the image memory 1005, is also stored in the image buffer information 2003. The analysis unit 1002 analyzes bit streams so as to retrieve a bit stream of Slice Date, which is then stored in the bit stream 2004.

PRIOR ART DOCUMENT

Non-Patent Document

Non-Patent Document 1: ITU-T Recommendation H.264 "Advanced video coding for generic audiovisual services", March 2005.

Non-Patent Document 2: "DirectX Video Acceleration Specification for H.264/AVC Decoding", December 2007.

DISCLOSURE OF THE INVENTION

Problem to be Solved by the Invention

In the configuration of the moving image decoding device 1000 shown in FIG. 11, the decoding unit 1004 is operable according to specification independent from the external input/output configuration of the decoding device; hence, this section is designed as a reusable IP core, which is used in various applications.

In contrast, the moving image coding technology such as the H.264 standard is a collection of numerous coding techniques (called coding tools), the entirety of which involves very complex standards. For this reason, it is difficult to guarantee the normal operation against erroneous bit streams, undergoing inclusion of errors, while securing compatibility with all coding tools, and it is uneasy to develop the decoding unit 1004 which is able to operate without problem in any environment. For this reason, it is necessary to facilitate development by limiting the specification of the decoding unit 1004, i.e. by limiting the scope of compatibility in advance. For instance, it is possible to simplify the countermeasure against erroneous bit streams by assuming an application which does need to take inclusion of errors into consideration.

Since the moving image coding technology such as the H.264 standard involves complex procedures, it is difficult to completely verify decoding of all codes during the development of the decoding device. For instance, there remains a drawback that the decoding device cannot correctly decode specific codes which rarely occur.

When the moving image decoding device 1000 shown in FIG. 11 is constituted using the decoding IP core that suffers from the foregoing drawback and the limited scope of compatibility, for example, the decoding unit 1004 may be possibly involved in erroneous operation due to conditions of input bit streams. This erroneous operation ranges from relatively slight damage, in which decoded picture may be partially disordered, to serious damage in which the entire operation of the decoding device is destabilized due to writing data into unpermitted storage area or operational suspension.

Normally, an essential solution to the foregoing drawback and the limited scope of compatibility is to appropriately correct the decoding IP core so as to secure perfect operation. However, correcting the decoding IP core may entail a highly increased cost for verification. If a decoding IP core designed by another manufacturer is adopted, it is very difficult to directly correct its design information. In this case, there is no other option to utilize the decoding IP core that still suffers from the foregoing drawback and the limited scope of compatibility.

It is an object of this invention to provide a moving image decoding device which is able to stably perform desired decoding on moving images with a limited scope of compatibility or partly erroneous operation.

Means for Solving the Problem

To achieve the foregoing object, this invention comprises an analysis unit that analyzes input bit streams so as to output first intermediate data and analysis information, a conversion rule storage unit that stores conversion rules, a conversion unit that converts the analysis information into second intermediate data according to conversion rules, and a decoding unit that decodes first intermediate data and second intermediate data output from the analysis unit and the conversion unit respectively.

The analysis information includes reference information to images intended for motion compensation, identification information for identifying frames, and bit streams with detected errors; hence, the conversion unit performs conversion on each of them according to conversion rules, thus outputting second intermediate data. Therefore, even when the decoding unit is incompatible with specific information included in the analysis information, the decoding unit is able to stably perform decoding.

In the procedure of generating intermediate data input to the decoding unit based on input bit streams, analysis information regarding input bit streams is supplied to the conversion unit; the conversion unit converts specific information, which may raise a problem of compatibility with the decoding unit, into a general form of information based on the analysis information, thus generating intermediate data; hence, it is possible to stably perform decoding.

Additionally, the conversion procedure does not involve direct processing of image signals, such as inverse quantization, inverse orthogonal transformation, motion compensation, and intra-frame prediction; hence, the foregoing effect can be achieved with a small amount of calculation.

Effect of the Invention

According to this invention, it is possible to stably perform desired moving image decoding on moving image data with a limited scope of compatibility or moving image data with partly erroneous operation with a reduced amount of calculation.

MODE FOR CARRYING OUT THE INVENTION

Figure 1:
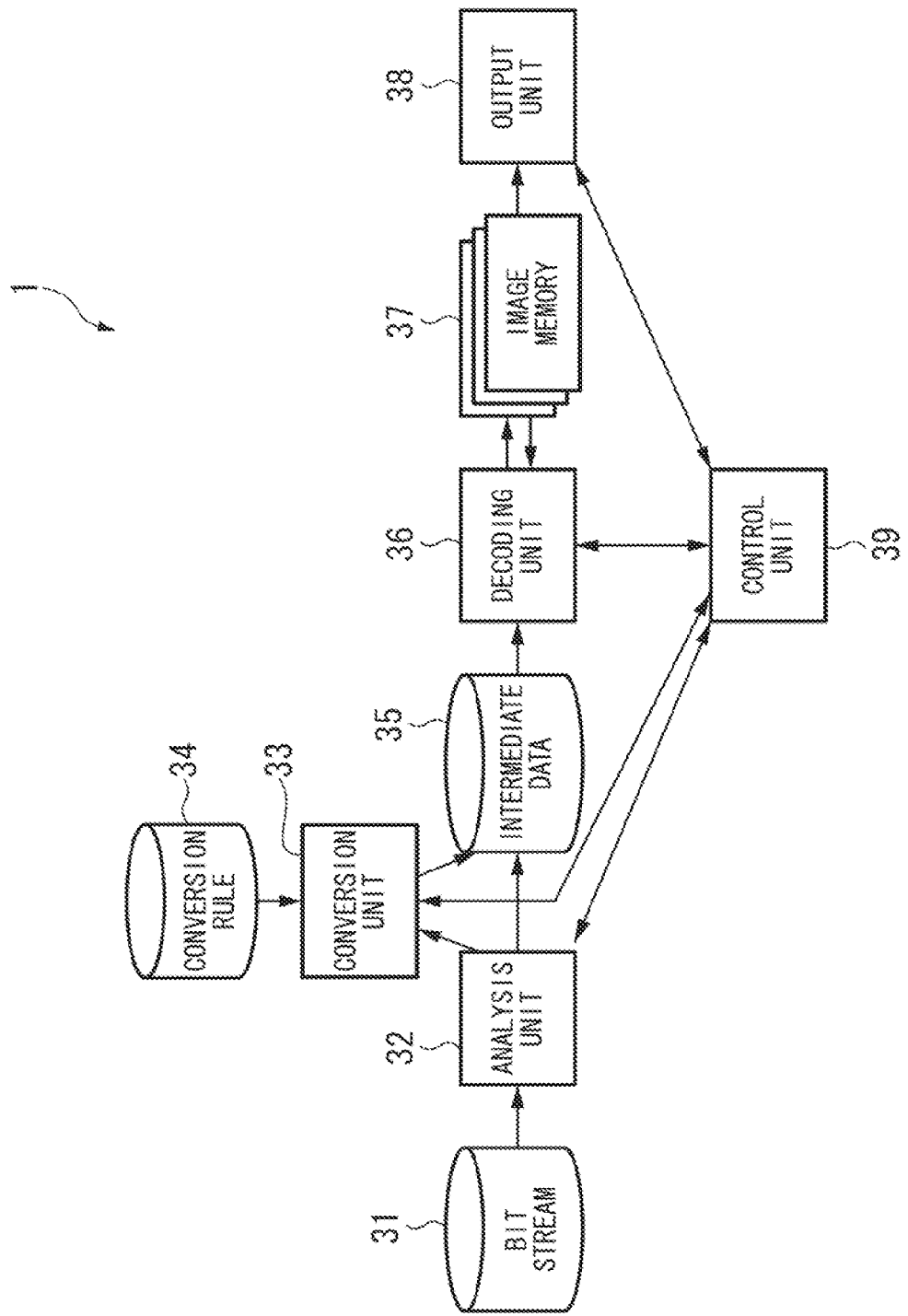
[FIG. 1] A block diagram of a moving image decoding device according to one embodiment of this invention.

Hereinafter, a moving image decoding device according to a preferred embodiment of this invention will be described with reference to the accompanying drawings. In the description and accompanying drawings, the constituent elements having the same functional configurations are designated by the same reference numerals; hence, a duplicate description thereof will be omitted here.

FIG. 1 is a block diagram of a moving image decoding device 1 according to one embodiment of this invention.

Figure 12:
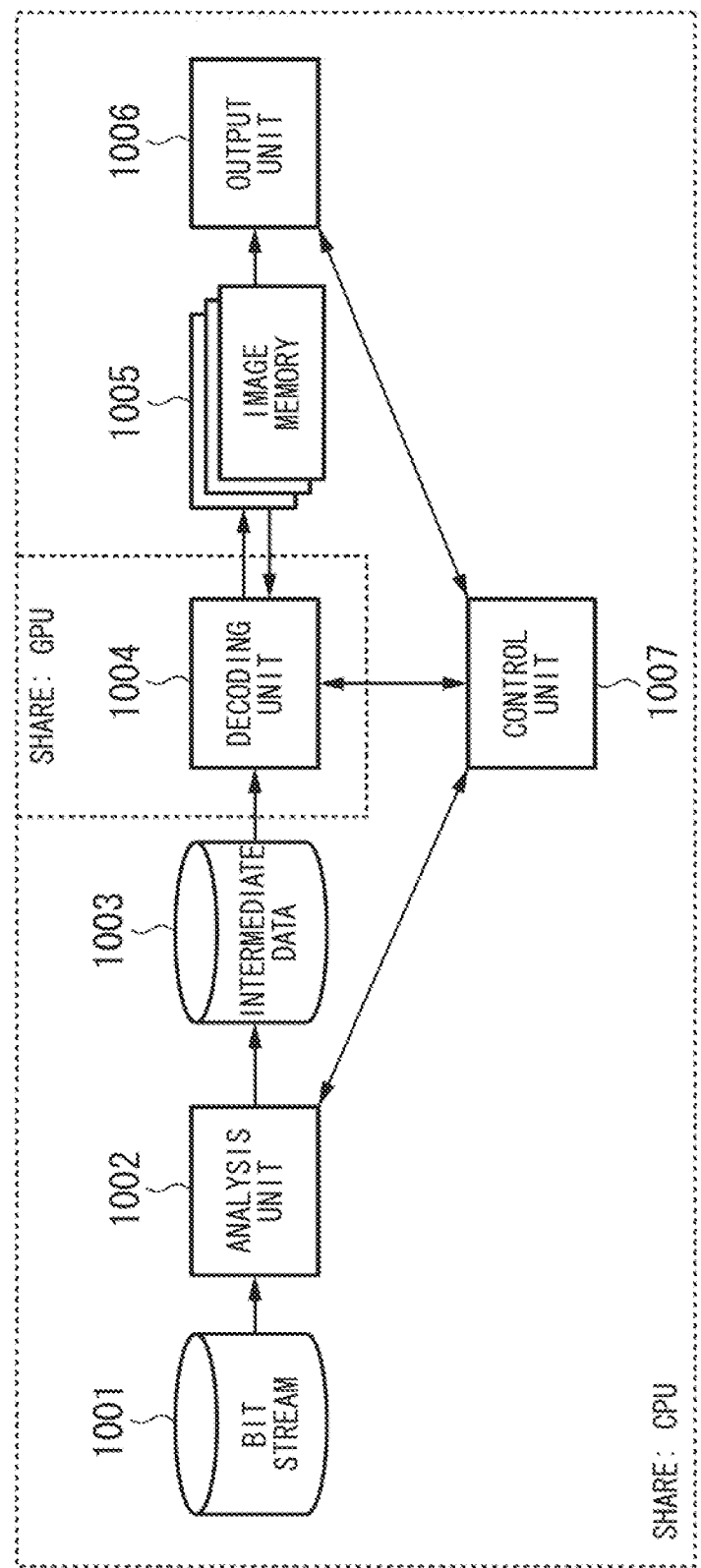
[FIG. 12] An illustration of functionality sharing between a CPU and a GPU in the moving image decoding device shown in FIG. 11.
Figure 13:
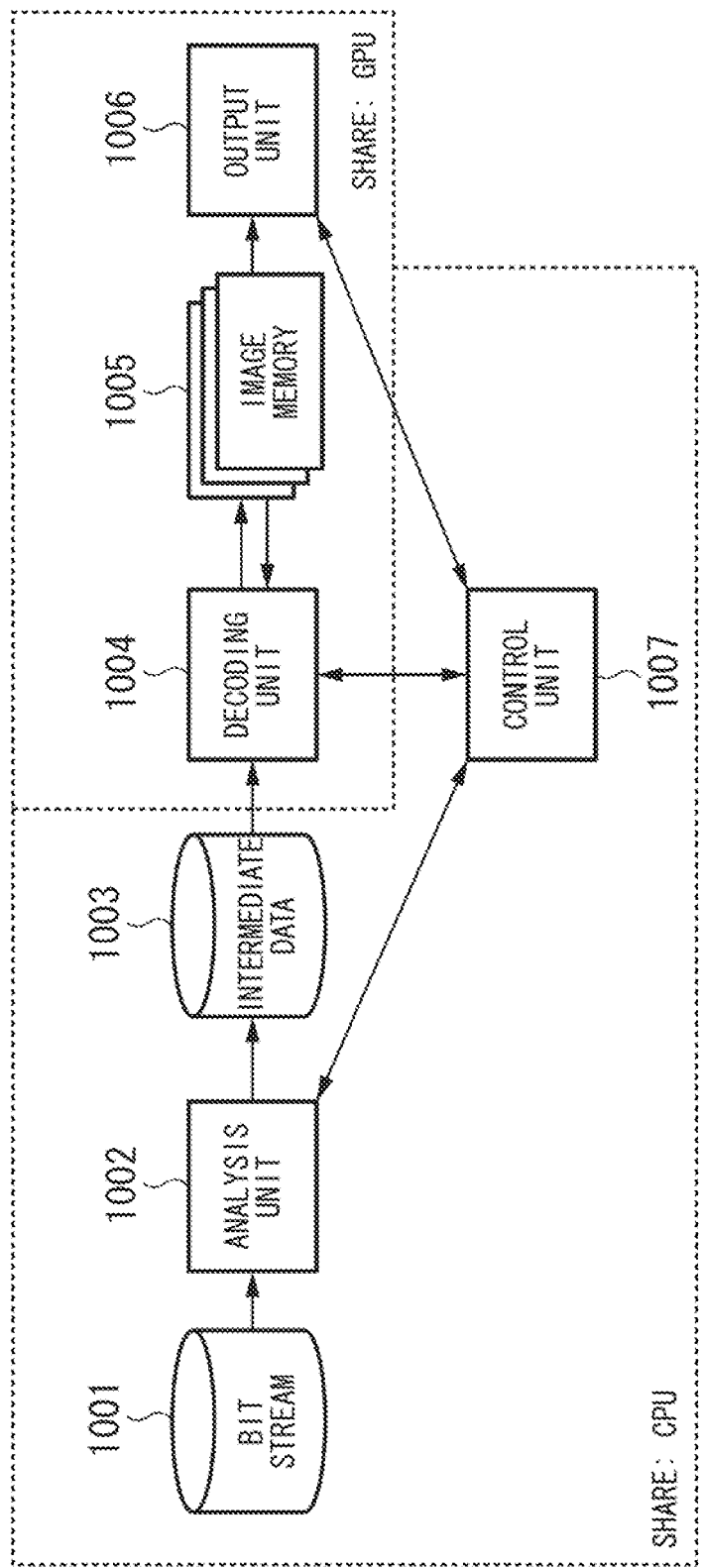
[FIG. 13] An illustration of functionality sharing between the CPU and the GPU in the moving image decoding device shown in FIG. 11.

The moving image decoding device 1 includes an analysis unit 32, a conversion unit 33, a conversion rule storage unit 34, an intermediate data storage unit 35, a decoding unit 36, an image memory 37, an output unit 38, and a control unit 39, wherein a bit stream storage unit 31 inputs bit streams. Similar to the moving image decoding device shown in FIG. 12, the moving image decoding device 1 will be described in such a way that the decoding unit 36 is assigned to the GPU while all the other constituent elements are assigned to the CPU and the storage unit connected to the CPU.

Figure 11:
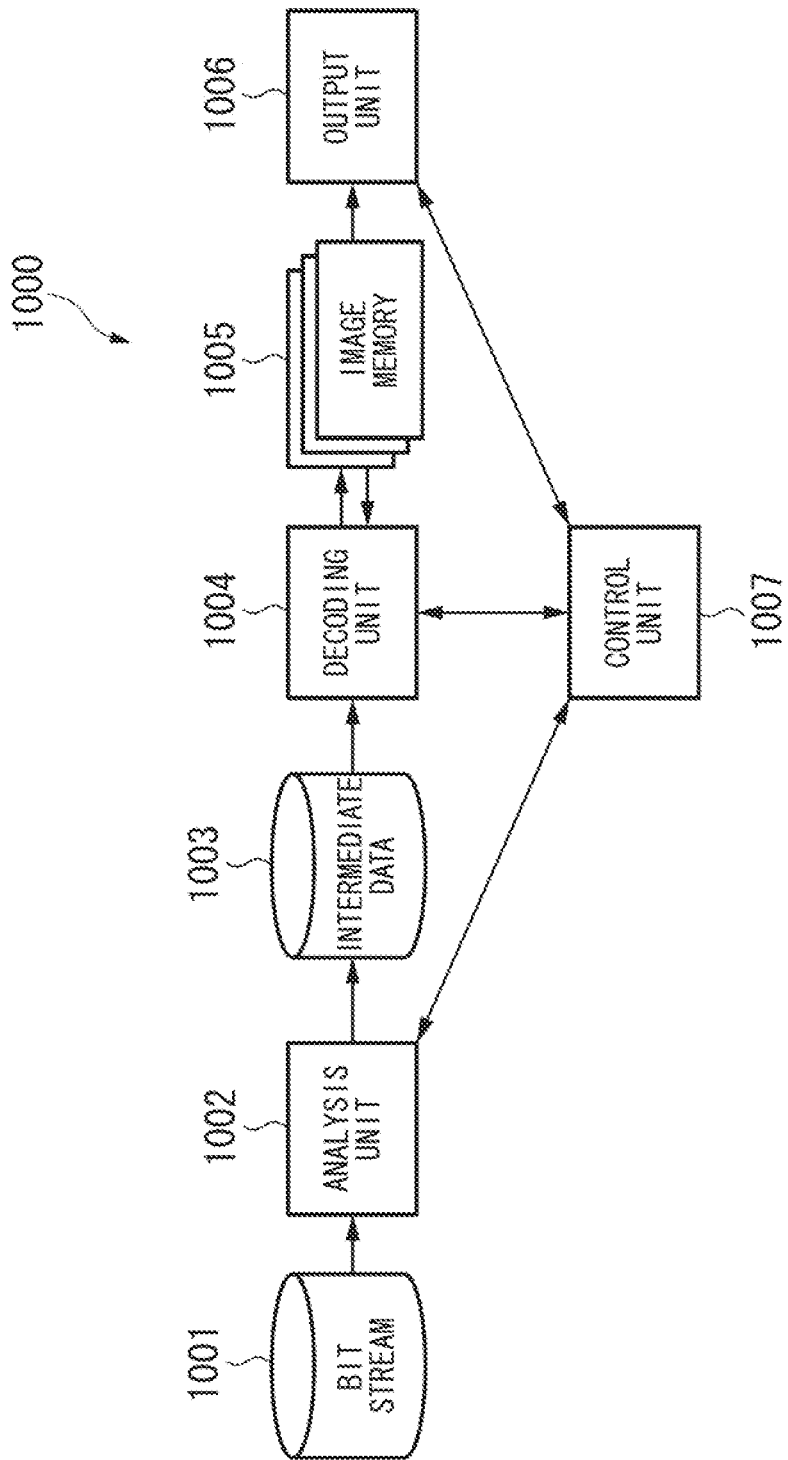
[FIG. 11] A block diagram of a conventional moving image decoding device.

The decoding unit 36, the image memory 37, and the output unit 38 shown in FIG. 1 are identical to the decoding unit 1004, the image memory 1005, and the output unit 1006 shown in FIG. 11 in terms of their functions and operations. Bit streams stored in the bit stream storage unit 31 are bit streams of coded moving images. Similar to intermediate data shown in FIG. 14, intermediate data stored in the intermediate data storage unit 35 includes the header information 2002, the image buffer information 2003, and the bit stream 2004.

In the moving image decoding device 1, the operations of the analysis unit 32 and the control unit 39 differ from the operations of the analysis unit 1002 and the control unit 1007. Additionally, the moving image decoding device 1 differs from the moving image decoding device 1000 in that the conversion unit 33 is equipped with the conversion rule storage unit 34.

The analysis unit 32 analyzes input bit streams so that a part of the analysis result is cast into the format of intermediate data, which is similar to the foregoing one, and output to the intermediate data storage unit 35 whilst the remaining of the analysis result is supplied to the conversion unit 33. The conversion unit 33 performs a predetermined conversion procedure on the supplied analysis result of bit streams in accordance with a conversion rule stored in the conversion rule storage unit 34, so that the conversion result is cast into the format of intermediate data and output to the intermediate data storage unit 35. In this connection, the conversion unit 33 may not perform a conversion procedure on image signals involving inverse quantization, inverse orthogonal transformation, motion compensation, and intra-frame prediction.

Based on various pieces of information retrieved from the analysis unit 32, the decoding unit 36, and the output unit 38, the control unit 39 controls the operations of the analysis unit 32 and the conversion unit 33 while implementing the foregoing controls as to which section of images within the image memory 37 needs to be supplied to the decoding unit 36 for decoding, which section the decoding result needs to be stored in, and which section of images needs to be supplied to the output unit 38.

Next, the operation of the moving image decoding device 1 will be described in detail with regard to a specific case. Herein, the specific case refers to decoding of bit streams of moving images compressed by the H.264 standard and adoption of the foregoing data format of intermediate data shown in FIG. 14. In a first embodiment of this invention, the header analysis information 2002 and the bit stream 2004, among the analysis information of the analysis unit 32 shown in FIG. 14, is supplied to the intermediate data storage unit 35 as similar to the foregoing technology, whilst the image buffer information shown in FIG. 14 is supplied to the conversion unit 33.

Figure 14:
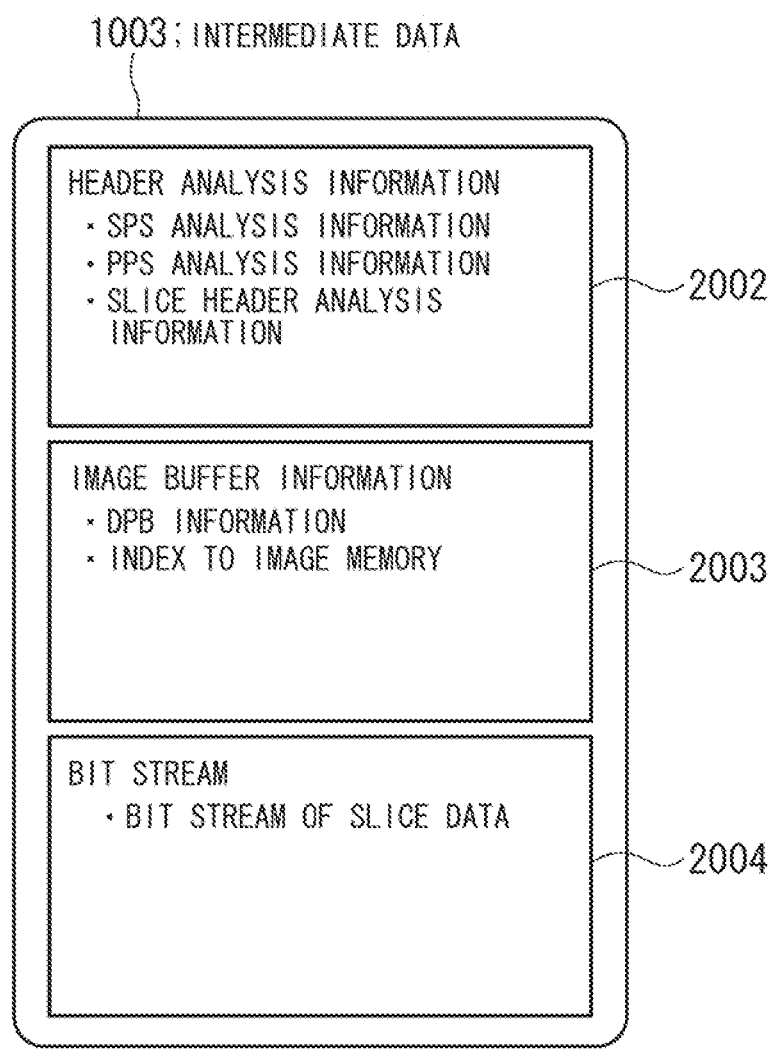
[FIG. 14] An illustration of an intermediate data configuration.

As shown in FIG. 14, the image buffer information 2003 includes DPB-related information used for decoding.

Figure 2:
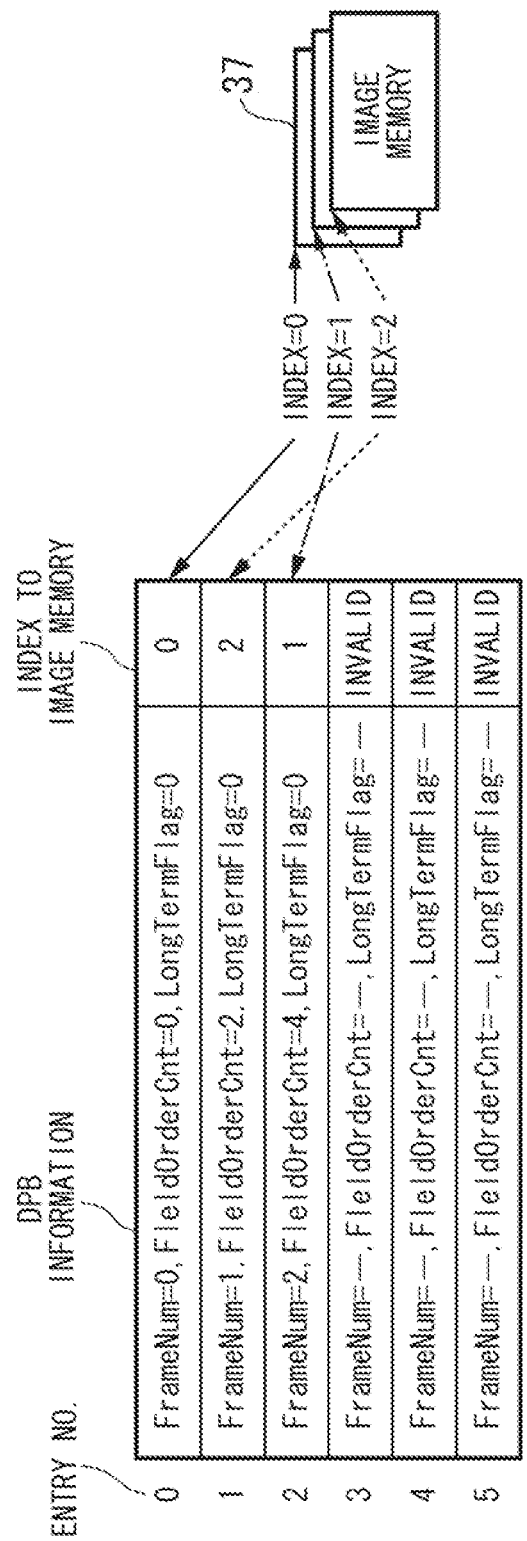
[FIG. 2] An illustration of DPB information included in intermediate data and index information to an image memory.

FIG. 2 shows examples of DPB information and index information to the image memory. Normally, the H.264 standard involves an entry of sixteen frames, whereas FIG. 2 shows an entry of six frames (i.e. the entry numbers "0" to "5"). Each entry records FrameNum corresponding to each frame, FieldOrderCnt, and a flag as to whether or not to denote Long Term reference picture (LongTermFlag). Indexes (i.e. reference information) corresponding to frames of the image memory 37 are stored in connection with each other. Within entries of DPB information, unassigned entries are described in FIG. 2 such that invalid values (denoted by "-" in FIG. 2) are stored in FrameNum whilst values indicating invalid entries are stored in image-memory indexes. For the sake of convenience, the following description refers to exemplary pieces of information, but entries of DPB information may further store more related information.

The decoding unit 36 shown in FIG. 1 performs a decoding procedure involving motion compensation, which selects a reference picture according to a reference picture number (ref_idx) recorded in a moving image bit stream with reference to the image buffer information 2003 of intermediate data output from the intermediate data storage unit 35, thus implementing motion compensation with reference to the corresponding section among sections of the image memory 37.

Figure 3:
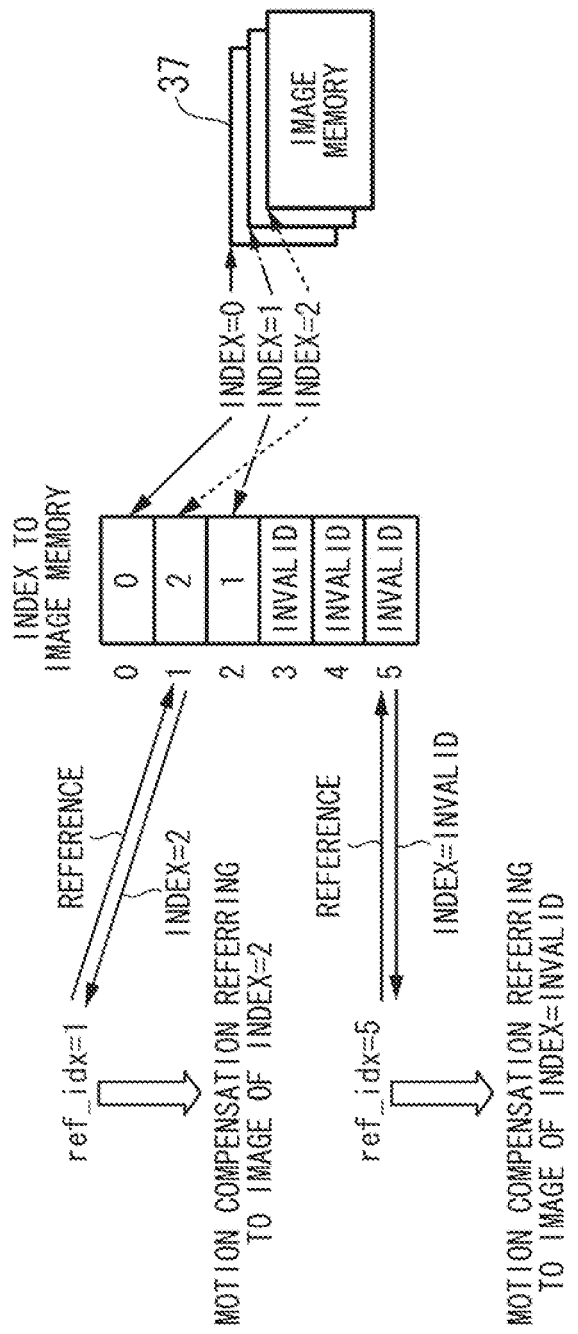
[FIG. 3] An illustration of motion compensation in a decoding unit shown in FIG. 1.

FIG. 3 illustrates an example of motion compensation intended for an index including an invalid value. In the case of ref_idx=1 in FIG. 3, the decoding unit 36 refers to Entry No.

"1" of the image buffer information 2003, thus retrieving Index "2" to the image memory. Thus, motion compensation is performed with reference to an image corresponding to Index "2" of the image memory 37.

In the case of ref_idx=5 in FIG. 3, however, when the decoding unit 36 refers to Entry No. "5", an invalid value is returned as an image-memory index. Since the image memory 37 may not include any image corresponding to the invalid value of the index, motion compensation cannot be implemented in this case. If a normal bit stream is given, it is unnecessary to implement motion compensation with reference to such an invalid image; but when a bit stream involves an error, the foregoing case of ref_idx may occur.

In this case, the decoding unit 36 may be able to perform an error procedure without implementing motion compensation referring to an invalid image if it is designed to cope with the operating situation under an erroneous environment. When the decoding unit 36 is designed to presuppose an errorless operating environment, the decoding unit 36 may easily execute motion compensation referring to an invalid image without conducting a special countermeasure. This situation may cause drawbacks, such as disordered image and unpermitted memory access, depending on the invalid value and the status of the image memory 37. In particular, serious negative impacts, in which the moving image decoding device is forced to suspend its entire operation and reboot, may possibly occur due to an unpermitted memory access.

To cope with this situation, the moving image decoding device 1 supplies some information, equivalent to the image buffer information 2003, to the conversion unit 33. The conversion unit 33 performs a conversion procedure based on a conversion rule stored in the conversion rule storage unit 34, thus outputting intermediate data to the intermediate data storage unit 35.

Figure 4:
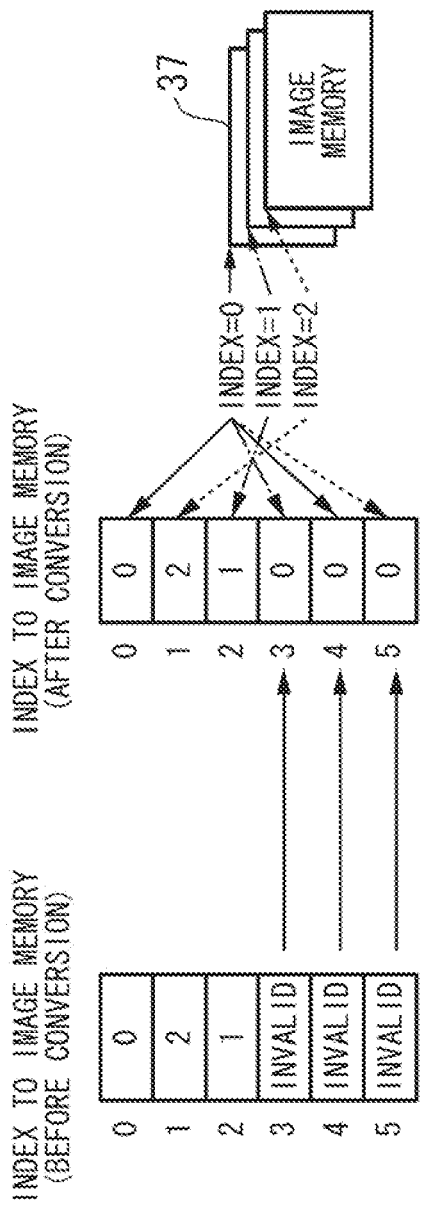
[FIG. 4] An illustration of a conversion procedure in a conversion unit according to a first embodiment of this invention.

FIG. 4 illustrates an example of a conversion procedure based on a conversion rule. In the example of FIG. 4, image-memory indexes of entries (i.e. Entries 3-5) indicating invalid values are each overwritten with any one of indexes of other entries not indicating invalid values, i.e. any one of valid indexes of other entries.

In this connection, the conversion unit 33 needs to overwrite invalid indexes of entries with valid indexes of entries in terms of other pieces of information such as FrameNum, FieldOrderCnt, and a flag (LongTermFlag) as to whether or not to denote Long Term reference picture. When the image buffer information 2003 includes a plurality of entries not indicating invalid indexes to the image memory 37, the conversion unit 33 overwrites invalid indexes of entries with a specific index of a top entry among these entries. Alternatively, it is possible to provide another selection method by which invalid indexes of entries are each overwritten with the lowest index to the image memory 37 assigned to a specific entry. When the image buffer information 2003 does not include any entry indicating an invalid index to the image memory 37, invalid indexes of entries are each overwritten with a specific index (e.g. a top index equals zero) indicating an appropriate one of images stored in the image memory 37, wherein other pieces of information such as FrameNum are overwritten with a predetermined number (e.g. they are all overwritten with "0"). The conversion rule of the conversion procedure adopted in the conversion unit 33 is stored in the conversion rule storage unit 34.

A decision as to whether or not the conversion procedure shown in FIG. 4 is valid depends on the function and operation of the decoding unit 36. Therefore, the control unit 39 may obtain various pieces of information, such as specification, compatibility information, device name and version information, from the decoding unit 36, thus controlling the conversion unit 33 whether or not to switch over to the foregoing conversion procedure. The same control is implemented in the other embodiments, which will be described below.

According to the first embodiment of this invention, the conversion unit 33 overwrites invalid indexes of entries to the image memory 37 with any one of valid indexes, so that intermediate data with overwritten indexes of entries is supplied to the decoding unit 36. For this reason, even when the decoding unit 36 is unable to adequately conduct an error procedure, it is possible to prevent the occurrence of unpermitted memory access, thus achieving stable operation of the moving image decoding device 1.

Figure 5:
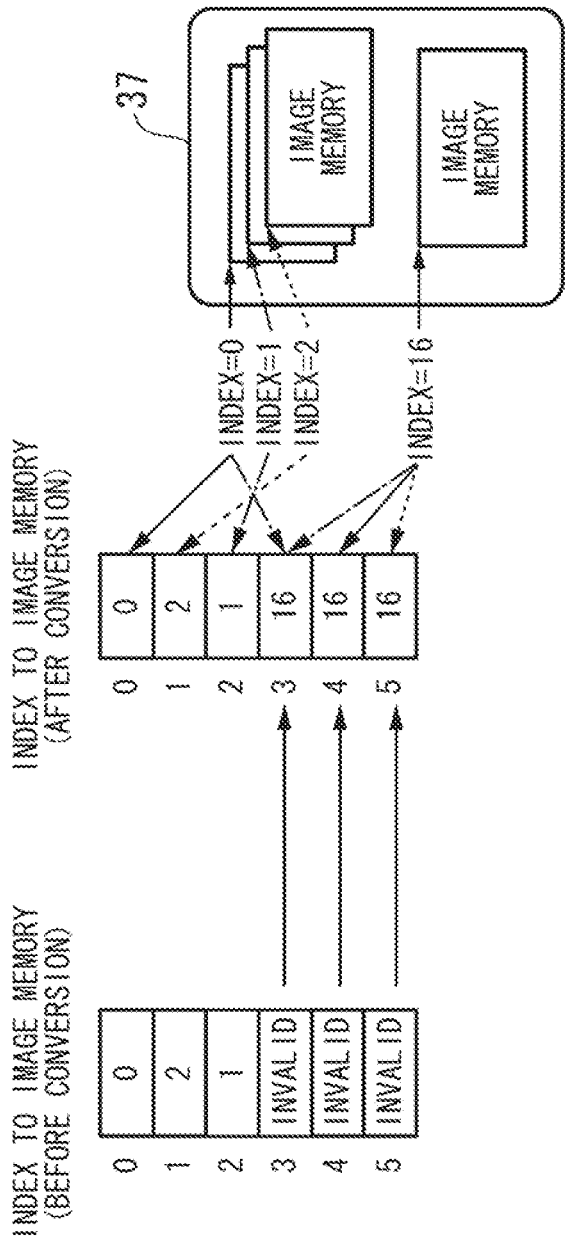
[FIG. 5] An illustration of another conversion procedure in the conversion unit according to the first embodiment of this invention.

FIG. 5 illustrates another example of a conversion procedure based on a conversion rule. In the example of FIG. 5, one frame of image section is secured in the image memory 37 and assigned with a specific index (e.g. an index of "16" in FIG. 5) in advance. For instance, this image section stores a gray image (i.e. all pixels have the pixel value equal to 128 for both luminance and chrominance). The conversion unit 33 overwrites invalid indexes of entries to the image memory 37, among all entries of the image buffer information 2003, a specific index (e.g. an index of "16" in FIG. 5) to a gray image, wherein other pieces of information such as FrameNum are overwritten with a predetermined value (e.g. they are all overwritten with "0"). This index and predetermined values of FrameNum are included in the conversion rule stored in the conversion rule storage unit 34.

According to the conversion rule shown in FIG. 5, invalid indexes of entries to the image memory 37 are each overwritten with a specific index referring to a specific image such as a gray image, so that entries with overwritten indexes are supplied to the decoding unit 36. Therefore, even when the decoding unit 36 is unable to adequately conduct an error procedure, it is possible to prevent the occurrence of unpermitted memory access and to thereby achieve stable operation of the moving image decoding device 1, whereby it is possible to suppress a disorder degree of image within a limited range.

Next, a second embodiment of this invention will be described. A moving image decoding device according to the second embodiment of this invention is identical to the moving image decoding device 1 shown in FIG. 1. In the first embodiment, the header analysis information 2002 and the bit stream 2004, among the analysis information of the analysis unit 32 shown in FIG. 14, are directly supplied to the intermediate data storage unit 35, whist the image buffer information 2003 shown in FIG. 14 is supplied to the conversion unit 33. In contrast, the second embodiment of this invention is designed such that the bit stream 2004 is directly supplied to the intermediate data storage unit 35, whilst the header analysis information 2002 and the image buffer information 2003 are supplied to the conversion unit 33.

Figure 6:
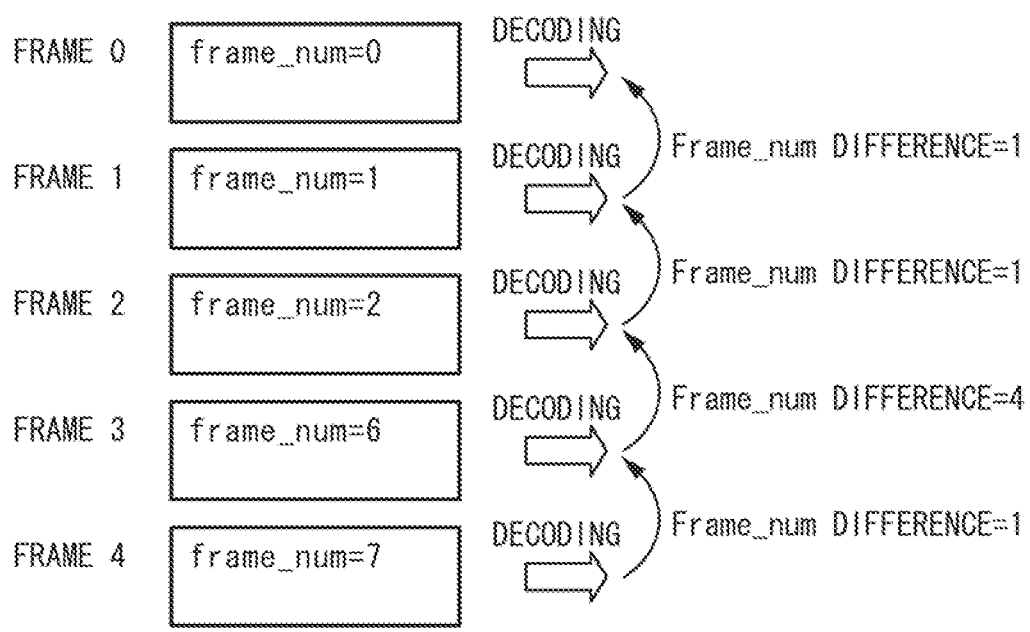
[FIG. 6] An illustration of a part of header analysis information included in intermediate data.

The conversion unit 33 performs a conversion procedure based on the header analysis information 2002, which will be described below. FIG. 6 shows a part of the header analysis information 2002. As shown in FIG. 6, the header analysis information 2002 includes frame_num used for identification of a reference frame. This frame_num is normally set to "0" at the top position of a sequence, wherein it is increased with one increment per each reference frame. The H.264 standard accepts more than one increment, thus possibly guaranteeing the situation of FIG. 6.

In FIG. 6, frame_num is increased with "1" increment with respect to Frames 0, 1 and 2. That is, the frame_num difference between the reference frame and its preceding frame is set to "1".

Frame 3 is increased in frame_num by "4" compared to its preceding Frame 2; hence, the frame_num difference is more than "1". The H.264 standard requires an exceptional procedure on the DPB when the frame_num increment (or difference) is more than "1", so that the decoding unit 36 needs to cope with the exception procedure. Since bit streams rarely involve the frame_num increment larger than "1", the decoding unit 36 may not be able to conduct normal decoding due to reasons in which the specification does not deal with rare bit streams or operation cannot be adequately verified on rare bit streams; hence, there occurs a problem due to disorder of decoded image.

Figure 7:
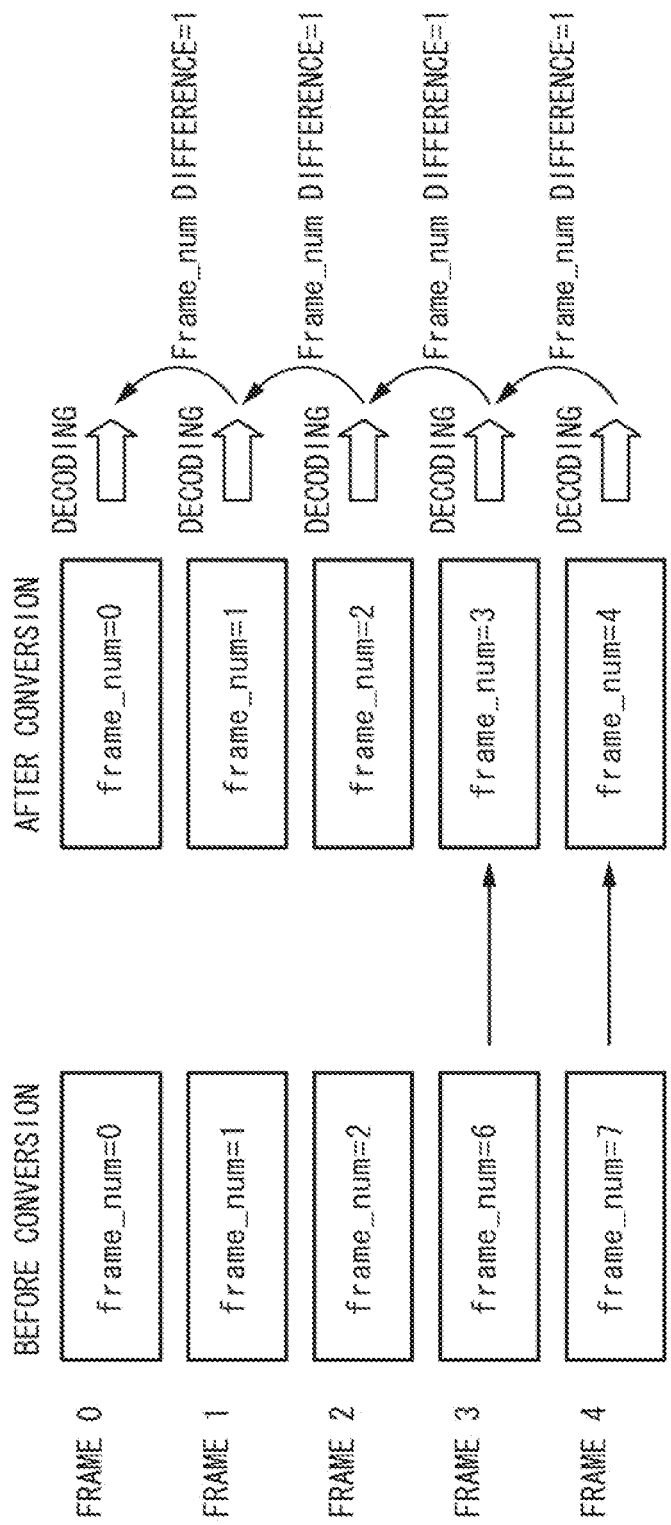
[FIG. 7] An illustration of a conversion procedure in a conversion unit according to a second embodiment of this invention.

FIG. 7 illustrates an example of a conversion procedure of the conversion unit 33 according to the second embodiment of this invention. Upon inputting the header information 2002, the conversion unit 33 checks the frame_num difference with the preceding frame, so that when the difference is larger than "1" (e.g. Frames 3, 4), the conversion unit 33 converts frame_num values into consecutive values, which are supplied to the intermediate data storage unit 35.

FIG. 7 shows frame_num values corresponding to FrameNum values of DPB information shown in FIG. 2; hence, when the conversion unit 33 converts frame_num values into consecutive values, the counterpart FrameNum values of the DPB information are correspondingly converted into consecutive values. Additionally, the decoding unit 36 performs an exceptional procedure on the DPB, when the frame_num increment is larger than "1", by use of the previous frame_num value before the conversion, thus securing the consistency of the DPB content. Due to this DPB procedure, the FrameNum value is correspondingly converted in response to the converted frame_num value so that the image buffer information 2003 including the converted FrameNum value is supplied to the intermediate data storage unit 35.

According to the second embodiment of this invention, even when the moving image decoding device inputs lowly-frequent bit streams with the frame_num difference larger than "1", the conversion unit 33 converts them into highly-frequent and normal intermediate data with the frame_num difference of "1", which is supplied to the decoding unit 36. Therefore, even though the decoding unit 36 is not able to adequately decode bit streams with the frame_num difference larger than "1", it is possible to prevent a problem due to disorder of decoded image.

Next, a third embodiment of this invention will be described. A moving image decoding device according to the third embodiment of this invention is identical to the moving image decoding device 1 shown in FIG. 1. In the moving image decoding device 1 of the first embodiment, the header analysis information 2002 and the bit stream 2004, in the analysis information of the analysis unit 32 shown in FIG. 14, are supplied to the intermediate data storage unit 35, whilst the image buffer information 2003 shown in FIG. 14 is supplied to the conversion unit 33. In contrast, the third embodiment of this invention is designed such that the header analysis information 2002 and the image buffer information 2003 are supplied to the intermediate data storage unit 35, whilst the bit stream 2004 is supplied to the conversion unit 33.

Figure 8:
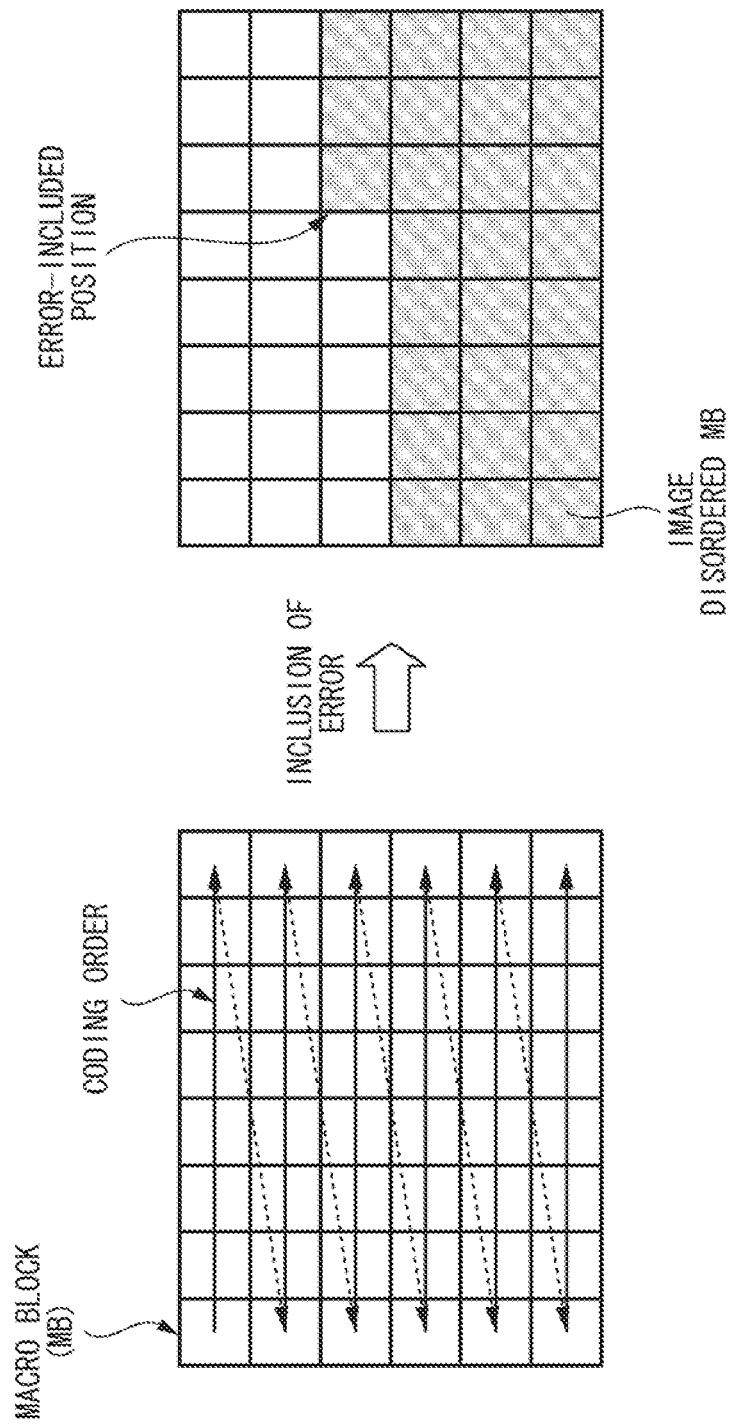
[FIG. 8] An illustration of the relationship between an error-included moving image bit stream and an image consisting of macro blocks.

The moving image decoding device 1 does not necessarily input normal bit streams; hence, it may possibly input bit streams including errors due to transmission lines or storage media. FIG. 8 illustrates an example of an impact due to inclusion of errors into moving image bit streams. As shown in the left-side illustration of FIG. 8 before conversion, the H.264 standard divides an image into 16×16 pixels of blocks called macro blocks (MB), so that a coding procedure is performed in a raster-scanning order from the upper-left block to the lower-right block in units of blocks. When an error is partly incorporated into a coded bit stream, inconsistency may occur in the analysis procedure of the bit stream due to the error; hence, as shown in the right-side illustration of FIG. 8 after conversion, an image is disordered in all the macro blocks (e.g. gray-painted regions in FIG. 8) following the error-included block in the raster-scanning order, let alone in the surrounding region of the error-included block.

Since the decoding result of an error-included bit stream causes a significantly disordered image which is by far different from the natural image, a very bad 5, impression will be given with respect to the decoding result. Additionally, if the decoding unit 36 is unable to adequately decode error-included bit streams, the moving image decoding device will be possibly involved in a critical problem such as suspension of decoding and abnormal ending.

Figure 9:
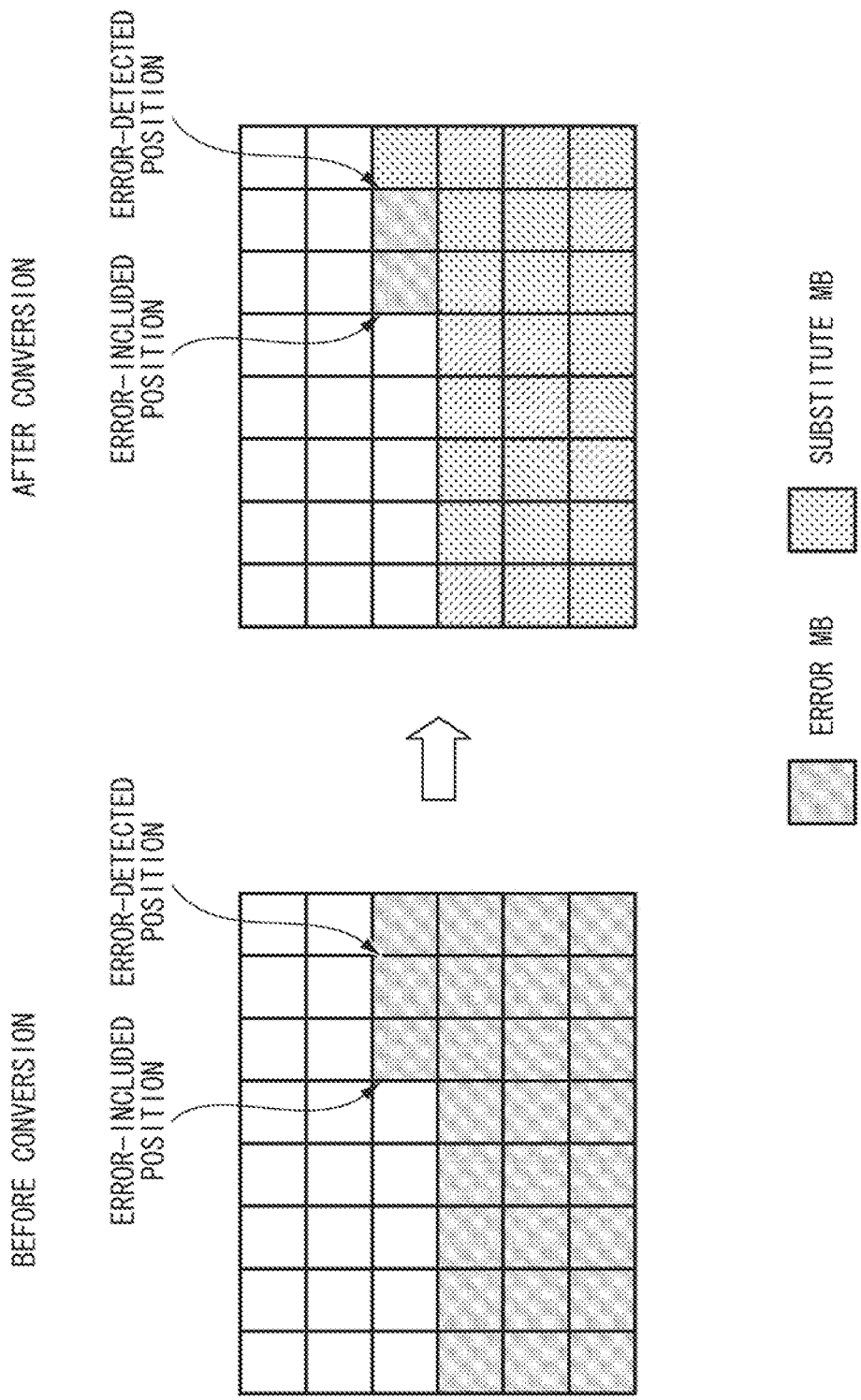
[FIG. 9] An illustration of a conversion procedure in a conversion unit according to a third embodiment of this invention.

FIG. 9 illustrates an example of a conversion procedure according to the third embodiment of this invention. Upon inputting the bit stream 2004 analyzed by the analysis unit 32, the conversion unit 33 performs an analysis procedure. This analysis procedure includes variable-length code decoding of a moving image decoding procedure (e.g. CAVLC code decoding and CABAC code decoding in the H.264 standard), but the analysis procedure does not include direct processing to image signals, such as inverse quantization, inverse orthogonal transformation, motion compensation, and intra-frame prediction.

In addition to the variable-length code decoding, the conversion unit 33 occasionally checks inconsistency included in decoding results (e.g. existence of undefined codes, reference to non-existing reference pictures, existence of inhibited coding modes), thus detecting inclusion of errors. Upon detecting inclusion of a bit error, as shown in FIG. 9, the conversion unit 33 performs a conversion procedure to substitute a bit stream of substitute macro blocks for a bit stream ranging from an error-detected position to a slice terminal-end.

As substitute macro blocks, it is necessary to adopt macro blocks which do not need direct processing to image signals, such as motion prediction, orthogonal transformation, and quantization. For instance, it is possible to name (A) inter-macro blocks without significant coefficients causing motion compensation with zero motion vectors, (B) inter-macro blocks without significant coefficients causing motion compensation with the same motion vector as the nearby macro block preceding to the error-detected position, (C) intra-macro blocks without significant coefficients causing DC intra-frame prediction, or the like. For instance, P picture (Predictive-coded picture) or B picture (Bi-directionally predictive-coded picture) employs the item (A), whilst I picture (Intra-coded picture) employs the item (C). Normally, as shown in FIG. 9, the error-detected position for detecting an error is slightly after the error-included position; hence, there still remains a possibility that an error-included macro block may be included, but its impact is alleviated owing to conversion compared to the previous state before conversion. The conversion unit 33 outputs bit streams, which have been subjected to a conversion procedure as shown in FIG. 9, to the intermediate data storage unit 35.

According to the third embodiment of this invention, upon detecting inclusion of error through an examination as to whether or not an error is included in a bit stream, a conversion procedure is performed to substitute a bit stream of substitute macro blocks for the successive portion of the bit stream; thus, it is possible to reduce unnatural disorder of image. Additionally, it is possible to alleviate a possibility of abnormal operation, thus achieving a stable operation of the moving image decoding device. Since the conversion unit 33 does not involve direct processing to image signals, such as motion prediction, motion compensation, orthogonal transformation and/or inverse orthogonal transformation, quantization and/or inverse quantization, it is possible to achieve the foregoing effect with a small amount of calculation.

Figure 10:
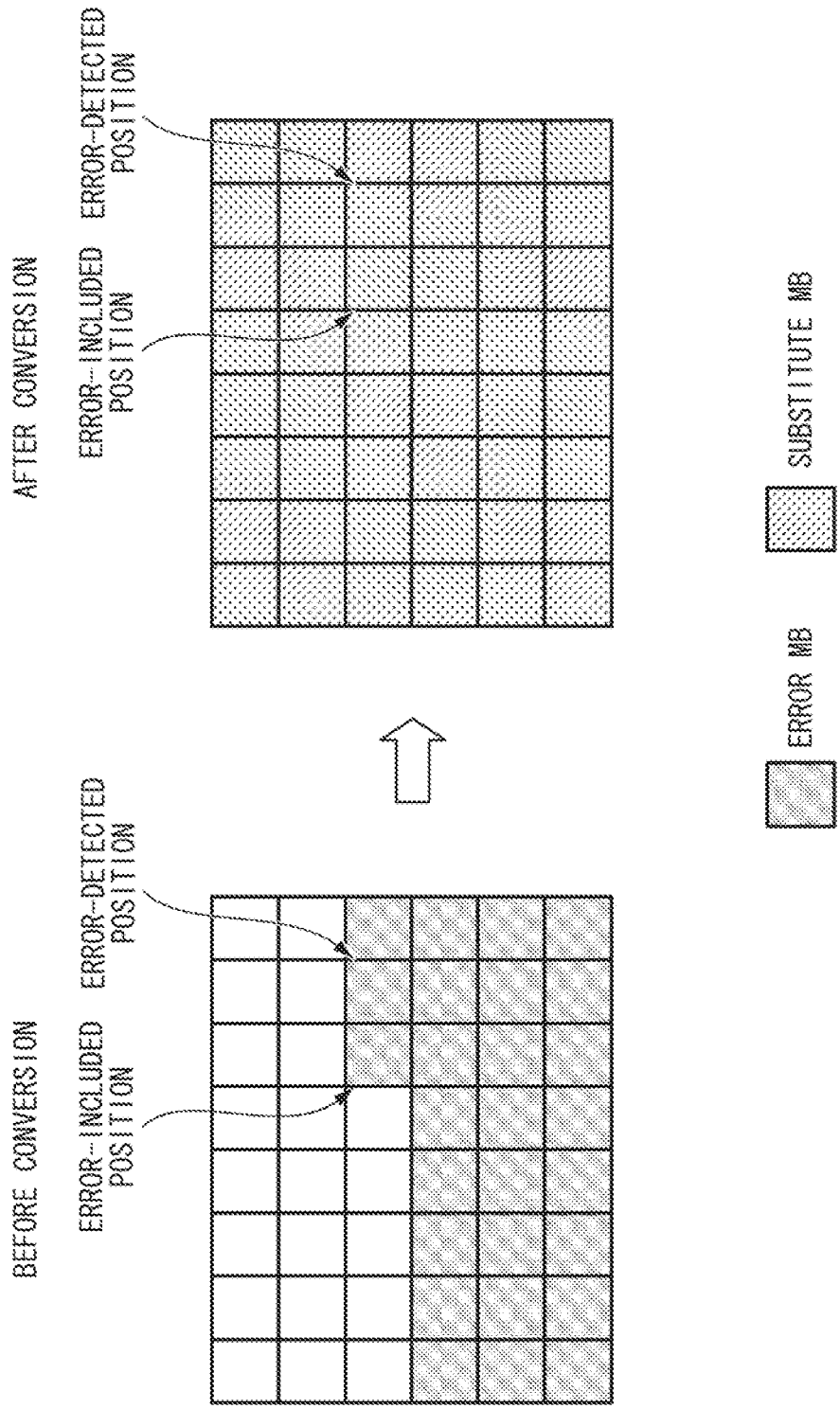
[FIG. 10] An illustration of another conversion procedure in a conversion unit according to the third embodiment of this invention.

Next, a variation of the third embodiment will be described. FIG. 10 shows another example of the conversion procedure of the conversion unit 33. Another example of the conversion procedure partly overlaps with the foregoing conversion procedure in that the conversion unit 33 analyzes bit streams so as to detect errors included in bit streams. In FIG. 10, upon detecting inclusion of error, the entire portion of a slice is replaced with substitute macro blocks.

As described above, it is possible to alleviate unnatural disorder of image since the conversion unit 33 entirely replaces a bit stream of a slice with substitute macro blocks upon detecting inclusion of error through an examination as to whether or not an error is included in a bit stream. Additionally, it is possible to eliminate a possibility of abnormal operation of the decoding unit 36 by replacing an erroneous bit stream with a perfectly normal bit stream, thus achieving a stable operation of the moving image decoding device. Since the conversion unit 33 performs the conversion procedure collectively in units of slices, it is possible to achieve the foregoing effect with a small amount of calculation.

The aforementioned embodiments of this invention refer to adoption of the H.264 standard; but this invention is not necessarily limited to adoption of the H.264 standard. Additionally, a limited number of examples is used to explain the specifics of the conversion procedure; but this invention is not necessary limited to the illustrated examples of conversion; hence, this invention is applicable to other types of conversion other than the illustrated examples of conversion.

For instance, the conversion procedure simply refers to the header analysis information 2002 in connection with frame_num; but the conversion procedure can be made on other values, such as FieldOrderCnt and pic_order_cnt_type with the same configuration. Additionally, the conversion procedure is described along with examples regarding the header analysis information 2002, the image buffer information 2003, and the bit stream 2004, which are classified from intermediate data; but it is possible to appropriately combine them.

Furthermore, the format of intermediate data is not necessarily limited to the foregoing format.

The embodiments of this invention are described with respect to a specific configuration (see FIG. 12) in which the decoding unit 36 is assigned to the GPU whilst the other constituent elements such as the analysis unit 32 are assigned to the CPU; but this invention is not necessarily limited to these embodiments. For instance, it is possible to provide another configuration in which the decoding unit 36 is assigned to a specific IP core, the other constituent elements such as the analysis unit 32 are assigned to a control processor connected to it, and the entire circuitry is built in a single LSI chip.

It is possible to produce a program realizing a decoding procedure (or a decoding method) of the moving image decoding device 1, whereby a computer system may read the program to run the decoding procedure. This program can be recorded on a computer-readable storage media, or this program can be distributed via a network.

The term "computer system" may embrace the OS and the hardware such as peripheral devices. If the "computer system" utilizes the WWW system, it may embrace a homepage providing environment (or a homepage display environment).

The term "computer-readable storage media" refer to storage devices embracing portable media such as flexible disks, magnetooptic disks, ROM and CD-ROM, and hard-disk units built in computer systems. The term "computer-readable storage media" may embrace communication lines temporarily holding programs, such as telephone lines and networks or the Internet all of which are used to transmit programs, and volatile memories for temporarily holding programs built inside computer systems acting as servers and clients. The above program can be drafted to achieve a part of the foregoing functionality or to achieve the foregoing functionality when combined with pre-installed programs of the computer system.

Heretofore, the moving image decoding device (or the decoding method) according to the preferred embodiments of this invention have been described with reference to the accompanying drawings; but this invention is not necessarily limited to these embodiments. It can be readily understood that further variations and modifications, which the skilled person in the art is able to easily design in the technological field of concept disclosed in this invention, naturally falls within the technological scope of this invention.

INDUSTRIAL APPLICABILITY

According to this invention, it is possible to stably implement a moving image decoding procedure on moving image data with limited compatibility or moving image data undergoing erroneous operation, and it is possible to supply high-precision moving image while suppressing the amount of calculation done in the moving image decoding device.

DESCRIPTION OF THE REFERENCE NUMERALS

1 Moving image decoding device
31 Bit stream storage unit
32 Analysis unit
33 Conversion unit
34 Conversion rule storage unit
35 Intermediate data storage unit
36 Decoding unit
37 Image memory
38 Output unit
39 Control unit
2002 Header analysis information
2003 Image buffer information
2004, Bit stream

The invention claimed is:
1. A moving image decoding device comprising:
an analysis unit that analyzes a bit stream so as to output first intermediate data and analysis information, prior to the bit stream being decoded;
a conversion rule storage unit that stores a conversion rule;
a conversion unit that converts within a non-network video layer the analysis information according to the conversion rule so as to output second intermediate data, prior to the bit stream being decoded; and
a decoding unit that decodes the first intermediate data and the second intermediate data output from the analysis unit and the conversion unit so that the bit stream is decoded,
wherein the conversion unit converts the analysis information within an image memory indexing a plurality of entries corresponding to frames of the image memory in that one or more of:

invalid indices of first entries of the entries are overwritten by valid indices of second entries of the entries,
the invalid indices are each overwritten with a predetermined index to a valid image frame;
when the bit stream includes an error, subsequent bit streams to the bit stream are replaced with replacement bit streams of substitute macro blocks from the error position to a slice end or the entire portion of the slice containing the error is replaced with substitute macro blacks.

2. The moving image decoding device according to claim 1, wherein a conversion procedure of the conversion unit precludes direct processing to image signals, including inverse quantization, inverse orthogonal transformation, motion compensation, and intra-frame prediction.

3. The moving image decoding device according to claim 1, wherein the analysis information includes the reference information to an image used for motion compensation, and wherein when the reference information refers to an invalid image, the conversion unit converts the reference information into reference information referring to a valid image.

4. The moving image decoding device according to claim 1, wherein when the analysis information includes low-frequent codes, the conversion unit converts low-frequent codes into high-frequent codes, so that the conversion unit performs conversion on another analysis information related to high-frequent codes.

5. The moving image decoding device according to claim 1, wherein the analysis information includes identification information for identifying frames, wherein the conversion unit calculates a difference between the identification information of a reference frame and another identification information regarding a specific frame preceding to the reference frame, and wherein when the difference is larger than "1", the conversion unit converts the difference to "1".

6. The moving image decoding device according to claim 1, wherein the analysis information includes an error-detected bit stream, and wherein the conversion unit replaces at least a part of the bit stream following an error-detected position with a substitute bit stream which is determined according to the conversion rule.

7. The moving image decoding device of claim 1, wherein entries within the bit stream that have invalid indexes to an image memory are overwritten prior to input to the decoding unit, such that occurrence of unpermitted memory access is prevented even where the decoding unit fails to perform error correction.

8. The moving image decoding device of claim 1, wherein the bit stream has a low frequency of occurrence, and the second intermediate data to which the analysis information is converted has a high frequency of occurrence, such that disordering of images is prevented even where the decoding unit fails to perform error correction.

9. The moving image decoding device of claim 1, wherein upon an error being detected within the bit stream and corrected within the second intermediate data, a subsequent bit stream is replaced, such that potential for the decoding unit to perform erroneous operations is reduced.

10. A moving image decoding method comprising:
prior to a bit stream being decoded, analyzing the bit stream so as to output first intermediate data and analysis information;
prior to the bit stream being decoded, converting the analysis information within a non-network video layer into second intermediate data according to a conversion rule; and
decoding the first intermediate data and the second intermediate data so that the bit stream is decoded,
wherein the analysis information is converted within an image memory indexing a plurality of entries corresponding to frames of the image memory via one or more of:
invalid indices of first entries of the entries are overwritten by valid indices of second entries of the entries,
the invalid indices are each overwritten with a predetermined index to a valid image frame;
when the bit stream includes an error, subsequent bit streams to the bit stream are replaced with replacement bit streams of substitute macro blocks from the error position to a slice end or the entire portion of the slice containing the error is replaced with substitute macro blocks.

11. A non-transitory computer-readable storage medium storing a program causing a computer to provide an analysis unit that analyzes a bit stream prior to the bit stream being decoded so as to output first intermediate data and analysis information, a storage unit that stores a conversion rule, a conversion unit that converts within a non-network video layer the analysis information into second intermediate data according to the conversion rule prior to the bit stream being decoded, and a decoding unit that decodes the first intermediate data and the second intermediate data output from the analysis unit and the conversion unit so that the bit stream is decoded,
wherein the conversion unit converts the analysis information within an image memory indexing a plurality of entries corresponding to frames of the image memory in that one or more of:
invalid indices of first entries of the entries are overwritten by valid indices of second entries of the entries,
the invalid indices are each overwritten with a predetermined index to a valid image frame;
when the bit stream includes an error, subsequent bit streams to the bit stream are replaced with replacement bit streams of substitute macro blocks from the error position to a slice end or the entire portion of the slice containing the error is replaced with substitute macro blocks.

\* \* \* \* \*